United States Patent
Raymond et al.

(10) Patent No.: US 6,990,544 B1
(45) Date of Patent: Jan. 24, 2006

(54) METHOD AND APPARATUS FOR DETECTING THE PRESENCE OF A HOT-PLUGGABLE COMPONENT IN A COMPUTER SYSTEM

(75) Inventors: Patrick A. Raymond, Sugar Land, TX (US); Sompong P. Olarig, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/466,025

(22) Filed: Dec. 17, 1999

(51) Int. Cl.
*G06F 13/00* (2006.01)

(52) U.S. Cl. .................. 710/302; 710/301; 710/303; 710/304

(58) Field of Classification Search ........... 710/103, 710/301–304, 100; 250/222; 711/102; 235/486; 439/67, 79; 361/110, 667; 362/551
See application file for complete search history.

(56) References Cited

U.S. PATENT DOCUMENTS

| | | | |
|---|---|---|---|
| 4,140,273 A * | 2/1979 | Townsend et al. | 235/485 |
| 5,365,383 A * | 11/1994 | Miller et al. | |
| 5,386,567 A * | 1/1995 | Lien | |
| 5,525,795 A * | 6/1996 | MacGregor et al. | |
| 5,774,328 A * | 6/1998 | Rector et al. | 361/667 |
| 5,882,214 A * | 3/1999 | Hillbish et al. | 439/79 |
| 6,049,656 A * | 4/2000 | Kim et al. | 392/419 |
| 6,065,069 A * | 5/2000 | Klein | 710/15 |
| 6,138,194 A * | 10/2000 | Klein et al. | 710/302 |
| 6,189,055 B1 * | 2/2001 | Eisele et al. | |
| 6,409,159 B1 * | 6/2002 | Asai et al. | 267/152 |
| 2003/0073436 A1 * | 4/2003 | Karabinis et al. | 455/429 |
| 2004/0021078 A1 * | 2/2004 | Hagler | 250/339.13 |

* cited by examiner

*Primary Examiner*—Rehana Perveen
*Assistant Examiner*—Kim T. Huynh

(57) ABSTRACT

A method and apparatus for detecting the presence of hot-pluggable components in a computer system. The method and apparatus includes an electromagnetic energy source located on a first side of a system board proximate an edge connector, the electromagnetic energy source for generating electromagnetic energy directed at least toward a second opposing side of the system board. The method and apparatus further includes an electromagnetic energy detector located on the second side of the system board, the electromagnetic energy detector for detecting a presence of electromagnetic energy when a hot-pluggable component is not mated to the edge connector and the electromagnetic energy is thereby unobstructed by the hot-pluggable component, the electromagnetic energy detector further for detecting an absence of electromagnetic energy when the hot-pluggable component is mated to the edge connector and the electromagnetic energy is thereby obstructed by the hot-pluggable component.

12 Claims, 2 Drawing Sheets

METHOD AND APPARATUS FOR DETECTING THE PRESENCE OF A HOT-PLUGGABLE COMPONENT IN A COMPUTER SYSTEM

FIELD OF THE INVENTION

The present invention pertains in general to techniques for detecting the presence of hot-pluggable components in a computer system, and in particular, but not by way of limitation, to a method and apparatus incorporating an electromagnetic energy source and an electromagnetic energy detector for determining when a hot-pluggable component's presence inhibits transmission of electromagnetic energy generated by the electromagnetic energy source.

BACKGROUND OF THE INVENTION

Early computer designs generally included a chassis with a plurality of individual components and assemblies mounted therein and connected to one another by means of wires, cables, brackets, nuts, bolts and the like. A major computer design advance occurred with the advent of printed circuit boards, integrated circuits and modular component assemblies. The printed circuit boards were, for example, formed of lightweight material and housed a myriad of components which were electrically interconnected with the component assemblies through wiring harnesses. The wiring harnesses and hard wire connections were subsequently replaced by technologically advanced connectors used for integrally coupling the individual components to each other and to other circuitry in the computer.

In the design of electronic equipment, the use of connectors, modular components, and specialized hardware has permitted key components and printed circuit boards to be efficiently added and removed. Such ease in the addition and deletion of computer components and printed circuit boards has facilitated assembly repair, upgrade, and/or changes in functionality.

Computer reliability and serviceability are also valuable design aspects. Originally, a rule of practice in the maintenance of electrical circuitry, such as computer hardware, was that of always turning the power to the computer off before components or printed circuit boards were added or removed from the computer chassis or support frame. Recent innovations have addressed the desirability to insert and remove modular components and printed cards from electrical equipment, such as computer hardware, when the computer is electrically connected and operational, i.e. "hot." This is now possible for hot-pluggable hard drives, and in these cases, the power may be disconnected from only the connector of the drive to be inserted and removed while allowing the adjacent components to remain "hot."

Removable computer components today include disc drives, drive cages, fans, power supplies, system I/O modules, processor boards, and other subassemblies. As referenced above, the removability of computer components allows for better overall serviceability of the computer system, which is a distinct advantage to both the user and the maintenance technician. A defective power supply in the main or central computer generally requires prompt replacement in order to limit downtime. It is for this reason that modular components and connectors facilitate prompt replacement and are thus popular in many computer designs.

The modularity of computer systems is thus recognized as an important design consideration. As referenced above, modules can be removed and examined for operability or other purposes much easier than permanently mounted fixtures within a computer chassis. Because computers provide an integral part of most business operations, it is of utmost importance to maintain the reliability and integrity of the computer system. When the various elements of a computer can be easily removed in a modular form, they can also be replaced to maintain the operational status of the computer.

Despite the advantages of allowing electrical components of a computer system to be hot-pluggable there are certain concerns and potential problems associated with hot-pluggable computer systems. In order to prevent damage to the hot-pluggable component and the computer system and to prevent electrical shock to a user inserting or removing the hot-pluggable component, computer systems include a mechanical switch associated with each hot-pluggable component connector which must be physically switched off and on during removal and insertion of the hot-pluggable component. The mechanical switch adds cost to the computer system, requires additional space for locating the switch, and can reduce reliability of the overall computer system due to the mechanical nature of the switches.

It would be advantageous, therefore, to devise a method and apparatus for detecting the presence of hot-pluggable components in a computer system without the use of mechanical switches.

SUMMARY OF THE INVENTION

The present invention comprises a method and apparatus for detecting the presence of hot-pluggable components in a computer system. The method and apparatus includes an electromagnetic energy source located on a first side of a system board proximate an edge connector, the electromagnetic energy source for generating electromagnetic energy directed at least toward a second opposing side of the system board. The method and apparatus further includes an electromagnetic energy detector located on the second side of the system board, the electromagnetic energy detector for detecting a presence of electromagnetic energy when a hot-pluggable component is not mated to the edge connector and the electromagnetic energy is thereby unobstructed by the hot-pluggable component, the electromagnetic energy detector further for detecting an absence of electromagnetic energy when the hot-pluggable component is mated to the edge connector and the electromagnetic energy is thereby obstructed by the hot-pluggable component.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

Figure 1:
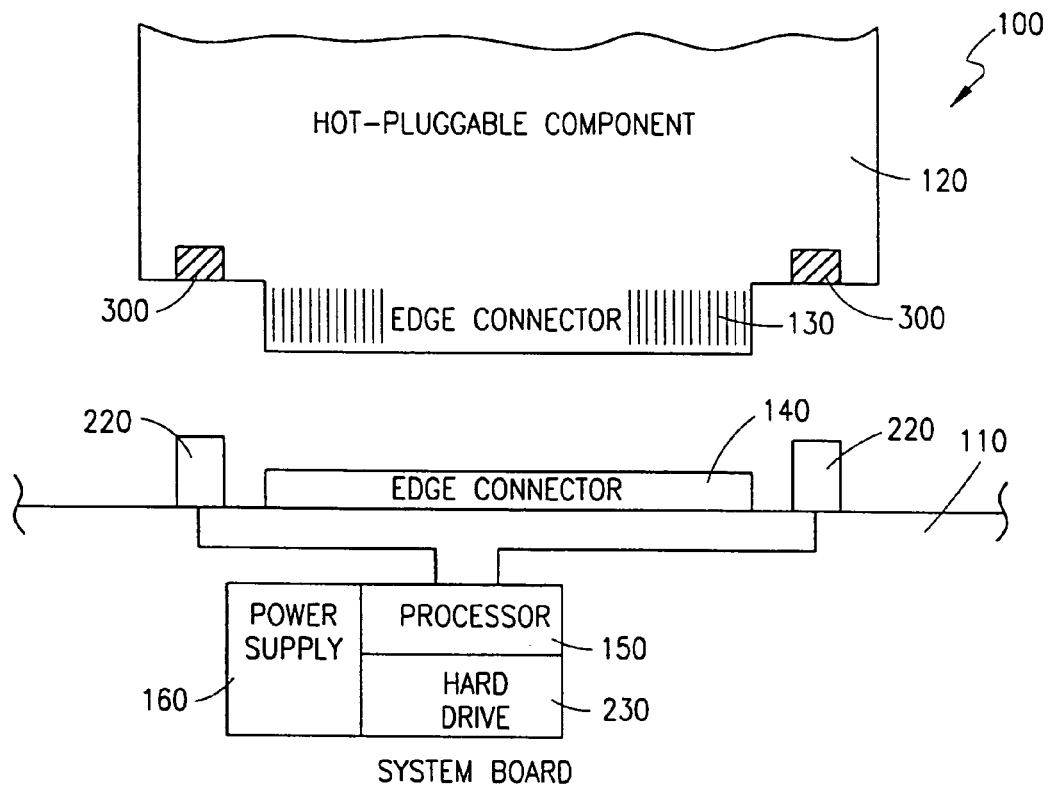
FIG. 1 is a frontal perspective of the present invention for detecting the presence of a hot-pluggable component in a computer system including functional blocks for effectuating the present invention.

Referring now to FIG. 1, there is respectively illustrated a frontal perspective of the present invention for detecting the presence of a hot-pluggable component in a computer system including functional blocks for effectuating the present invention. A computer system is shown generally at 100 and includes a system board 110 and a hot-pluggable component 120. The hot-pluggable component 120 is connected to the system board 110 by mating an edge connector 130 of the hot-pluggable component 120 to a corresponding edge connector 140 of the system board 110. The hot-pluggable component 120 can be any type of computing device such as, but not limited to, a disk controller, a network interface card or a video card and is designed such that the hot-pluggable component 120 can be connected to the system board 110 of the computer system 100 while the computer system 100 is powered-up and operating. A further, more detailed description of two embodiments of the present invention is now provided in FIGS. 2 and 3.

Figure 2:
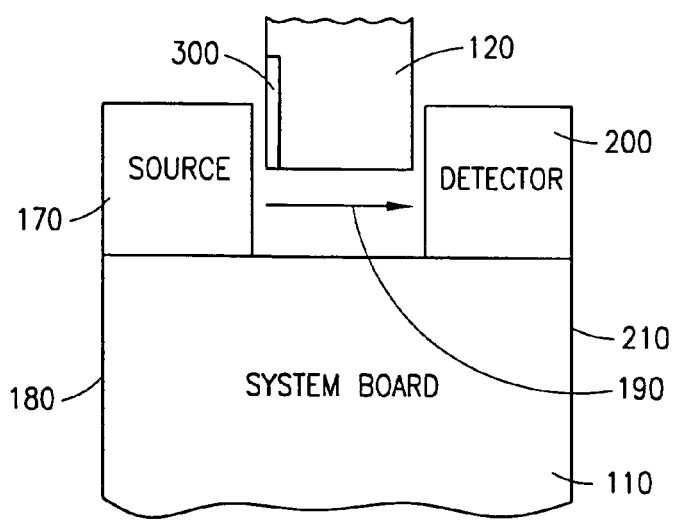
FIG. 2 is a cross sectional perspective of a first embodiment of the present invention for detecting the presence of a hot-pluggable component in a computer system.

Referring additionally now to FIG. 2, there is illustrated a cross sectional perspective of a first embodiment of the present invention for detecting the presence of the hot-pluggable component 120 in the computer system 100. Prior to connection of the hot-pluggable component 120 to the system board 110, a processor 150 determines that the hot-pluggable component 120 is not connected to the system board 110 and instructs a power supply 160 to disable power to the edge connector 140 of the system board 110. It should be noted that the edge connector 140 can be replaced with other connectors, including cable connectors, fibre channel connectors, USB connectors, serial connectors, etc. To detect the absence of the hot-pluggable component 120, an electromagnetic energy source 170, for instance an infra-red transmitter, magnetic radiation source, ultrasonic transmitter or other energy transmitter, is located on a first side 180 of the system board 110 proximate a first end of the edge connector 140 of the system board 110 and transmits electromagnetic energy 190 directed at least toward an electromagnetic energy detector 200 located on a second side 210 of the system board 110 proximate the first end of the edge connector 140 of the system board 110. The source 170 and the detector 200 can be constructed of individual units or, as is commonly available in the industry, can be constructed in a single unit. In either event, the source 170 and detector 200 combination is identified as element 220 in FIG. 1, for purposes of clarity.

When the hot-pluggable component 120 is absent, and therefore not connected to the system board 110, the electromagnetic energy 190 transmitted by the source 170 travels unimpeded and is detected by the detector 200. The detection of a presence of the electromagnetic energy 190 is communicated to the processor 150 which interprets the presence of the electromagnetic energy 190 as an indication that the hot-pluggable component 120 is not present. The processor 150 (or "hot plug" controller) stores the indication that the hot-pluggable component 120 is not present and instructs the power supply 160 to disable power to the edge connector 140 on the system board 110.

When the hot-pluggable component 120 is present and connected to the system board 110 the electromagnetic energy 190 transmitted by the source 170 is impeded by the hot-pluggable component 120 and the electromagnetic energy 190 is not detected by the detector 200. The detection of an absence of the electromagnetic energy 190 is communicated to the processor 150 which interprets the absence of the electromagnetic energy 190 as an indication that the hot-pluggable component 120 is present. The processor 150 stores in the hard drive 230 the indication that the hot-pluggable component 120 is present and instructs the power supply 160 to enable power to the edge connector 140 on the system board 110.

The location of the source 170 and detector 200 combination 220 and the shape of the hot-pluggable component 120 are designed such the edge connector 130 of the hot-pluggable component 120 makes physical and electrical contact with the edge connector 140 of the system board 110 prior to the hot-pluggable component 120 obstructing the electromagnetic energy 190 as the hot-pluggable component 120 is mated to the system board 110. Similarly, as the hot-pluggable component 120 is extracted from the system board 110, the hot-pluggable component 120 clears the path of the electromagnetic energy 190 prior to the edge connector 130 of the hot-pluggable component 120 breaking physical and electrical contact with the edge connector 140 of the system board 110. Therefore, the edge connector 140 of the system board 110 is always powered-down when electrical contact is made or broken between the edge connector 130 of the hot-pluggable component 120 and the edge connector 140 of the system board 110.

Figure 3:
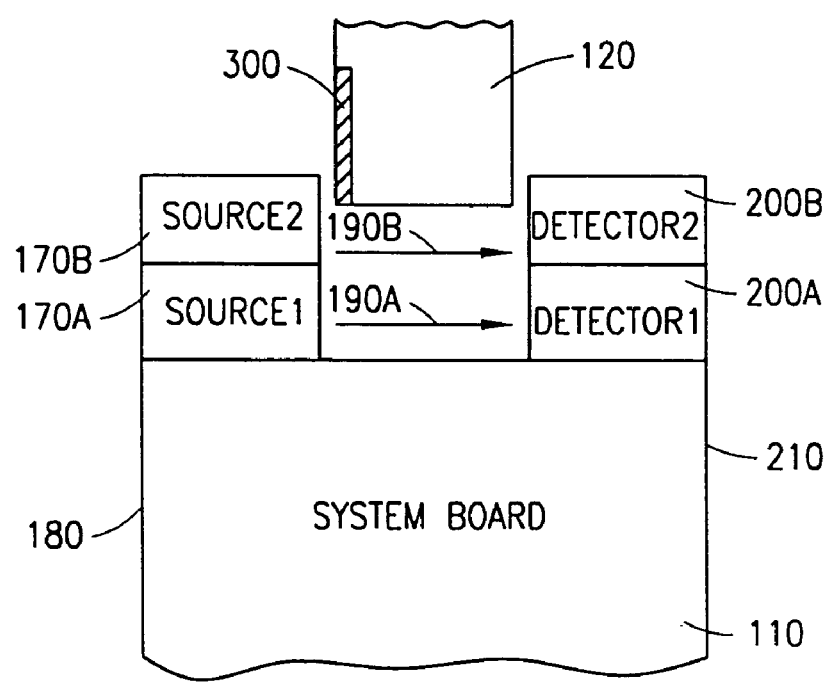
FIG. 3 is a cross sectional perspective of a second embodiment of the present invention for detecting the presence of a hot-pluggable component in a computer system.

Referring additionally now to FIG. 3, there is illustrated a cross sectional perspective of a second embodiment of the present invention for detecting the presence of the hot-pluggable component 120 in the computer system 100. The second embodiment of the present invention is identical to the first embodiment but further includes additional source 170 and detector 200 combinations 220 stacked on top of one another. Thus, whereas the first embodiment contains a first source 170A and a first detector 200A, the second embodiment further includes at least a second source 170B and detector 200B. It is understood, however, that the second embodiment of the present invention may include any number of additional source 170 and detector 200 combinations 220. Each of the source 170 and detector 200 combinations communicate with the processor 150 and can individually or collectively determine the presence or absence of the hot-pluggable component 120 within its affect region. Therefore, a determination can be made by the processor 150 as to whether the hot-pluggable component 120 is approaching or retreating from the system board 110 by tracking the sequence of detections.

In a further implementation of both the first and second embodiments of the present invention an additional source 170 and detector 200 combination 220 in the case of the first embodiment, or an additional set of source 170 and detector combinations 220, in the case of the second embodiment, are located on a second side of the edge connector 140 of the system board 110. While the first and second embodiments accurately detect the presence or absence of the hot-pluggable component 120 if the hot-pluggable component 120 is inserted or removed sufficiently horizontal to the system board 110 it often occurs that the hot-pluggable component 120 is inserted or removed at an angle with respect to the system board 110. This is particularly common in the case where the hot-pluggable component 120 is removed as users tend to "rock" the hot-pluggable component 120 to remove the edge connector 140 from the system board 110. If the hot-pluggable component 120 is inserted or removed at an angle, the processor 150 may incorrectly determine the presence of absence of the hot-pluggable component 120. Use of the additional source 170 and detector 200 combination 220 or the additional set(s) of source 170 and detector 200 combination(s) 200 assures an accurate determination of the presence or absence of the hot-pluggable component 120.

Depending on the frequency of the electromagnetic energy 190 transmitted by the source 170, the material used to construct the hot-pluggable component 120 may, in certain circumstances, not impede the transmission of the particular electromagnetic energy 190. In such cases, additional material 300, which is impervious to the electromagnetic energy 190, is applied to the hot-pluggable component 120. For example, a plastic material or solder can be used as the additional material 300.

Yet in another embodiment of the present invention, an emitter/detector pair (i.e., the electromagnetic energy source and the detector) uses reflective energy to determine the presence of a hot-pluggable component. That is, when the hot pluggable component is in place, it reflects emitted infra-red energy (or any other type of energy) and the detector receives that reflected energy. Thus, the emitter and detector in this embodiment could be on the same side of the system board. When the hot-pluggable component is removed, nothing reflects the emitted energy and, accordingly, the detector indicates an absence of a hot-pluggable component.

Although the preferred embodiments of the apparatus and method of the present invention have been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims.

What is claimed is:

1. A method for detecting the presence of a hot-pluggable component in a computer system comprising the steps of:
   generating electromagnetic energy from a first electromagnetic energy source on a first side of a system board proximate a connector, the electromagnetic energy directed at least toward a second side of the system board opposing the first electromagnetic energy source;
   generating electromagnetic energy from a second electromagnetic energy source located on top of the first electromagnetic energy source, the electromagnetic energy directed at least toward a second side of the system board opposing the second electromagnetic energy source;
   detecting a presence of the electromagnetic energy from the first electromagnetic energy source at a first electromagnetic energy detector on the second side of the system board when the hot-pluggable component is not mated to the connector and the electromagnetic energy from the first electromagnetic energy source is thereby unobstructed by the hot-pluggable component;
   detecting an absence of electromagnetic energy from the first electromagnetic energy source at the first electromagnetic energy detector on the second side of the system board when the hot-pluggable component is mated to the connector and the electromagnetic energy from the first electromagnetic energy source is thereby obstructed by the hot-pluggable component;
   detecting a presence of the electromagnetic energy from the second electromagnetic energy source at a second electromagnetic energy detector located on top of the first electromagnetic energy detector when the hot-pluggable component is not mated to the connector and the electromagnetic energy from the second electromagnetic energy source is thereby unobstructed by the hot-pluggable component; and
   detecting an absence of electromagnetic energy from the second electromagnetic energy source at the second electromagnetic energy detector on the second side of the system board when the hot-pluggable component is mated to the connector and the electromagnetic energy from the second electromagnetic energy source is thereby obstructed by the hot-pluggable component.

2. The method, as recited in claim 1, further comprising the step of communicating the detected presence or absence of electromagnetic energy to a processor.

3. The method, as recited in claim 2, further comprising the steps of:
   storing an indication that the hot-pluggable component is absent when the presence of electromagnetic energy is detected; and
   storing an indication that the hot-pluggable component is present when the absence of electromagnetic energy is detected.

4. The method, as recited in claim 1, further comprising the step of locating a material which is impervious to the electromagnetic energy at a position on the hot-pluggable component so that the material obstructs the electromagnetic energy when the hot-pluggable component is mated to the connector.

5. The method, as recited in claim 1, wherein the steps of generating the electromagnetic energy from the first and second sources comprises the steps of generating respective beams of electromagnetic energy directed toward the second opposing side of the system board.

6. A method for detecting the presence of a hot-pluggable component comprising:
   generating electromagnetic energy on a first side of a system board proximate a connector, the electromagnetic energy directed at least toward a second opposing side of the system board;
   detecting a presence of the electromagnetic energy on the second side of the system board when the hot-pluggable component is not mated to the connector; and
   detecting an absence of electromagnetic energy on the second side of the system board when the hot-pluggable component is mated to the connector,
   wherein generating comprises generating a plurality of independent beams of electromagnetic energy directed toward the second opposing side of the system board, a source of each of the plurality of beams located progressively more distant from the system board, and
   wherein detecting comprises independently detecting the presence or absence of each of the plurality of beams on the second side of the system board, a detector of each of the plurality of beams located progressively more distant from the system board, the plurality of beams sequentially becoming obstructed as the hot-pluggable component is mated to the connector and the electromagnetic energy is obstructed by the hot-pluggable component and the beams sequentially becoming unobstructed as the hot-pluggable component is removed from the connector and the electromagnetic thereby becomes unobstructed by the hot-pluggable component indicating the approach or retreat of the hot-pluggable component respectively.

7. The method, as recited in claim 1, wherein the electromagnetic energy is infra-red energy.

8. A computer system comprising:
   a first electromagnetic energy source located on a first side of a system board proximate a first end of a connector, the first electromagnetic energy source for generating electromagnetic energy directed at least toward a second side of the system board opposing the first electromagnetic energy source;

a second electromagnetic energy source located on top of the first electromagnetic energy source, the second electromagnetic energy source for generating electromagnetic energy directed at least toward the second side of the system board opposing the second electromagnetic energy source;

a first electromagnetic energy detector located on the second side of the system board, the first electromagnetic energy detector for detecting a presence of electromagnetic energy from the first electromagnetic energy source when a hot-pluggable component is not mated to the connector and for detecting an absence of the electromagnetic energy from the first electromagnetic energy source when the hot-pluggable component is mated to the connector; and a second electromagnetic energy detector located on top of the first electromagnetic energy detector, the second electromagnetic energy detector for detecting a presence of electromagnetic energy from the second electromagnetic energy source when the hot-pluggable component is not mated to the connector and for detecting an absence of the electromagnetic energy from the second electromagnetic energy source when the hot-pluggable component is mated to, approaching or retreating from the edge connector and the electromagnetic energy from the second electromagnetic energy source is thereby obstructed by the hot-pluggable component.

9. The computer system, as recited in claim 8, further comprising a processor for communicating with each of the first and second electromagnetic energy detectors for receiving the detection of the presence or absence of electromagnetic energy by the electromagnetic energy detectors.

10. The computer system, as recited in claim 9, further comprising a hard drive for storing an indication that the hot-pluggable component is absent when the presence of electromagnetic energy is detected, the hard drive further for storing an indication that the hot-pluggable component is absent when the absence of electromagnetic energy is detected.

11. The computer system, as recited in claim 10, wherein the electromagnetic energy is infra-red energy, magnetic energy or ultrasonic energy.

12. The computer system of claim 8, wherein the connector is one of an edge connector, a cable connector, a fibre channel connector, and a USB connector.

* * * * *